(12) United States Patent
Stork

(10) Patent No.: US 7,082,979 B2
(45) Date of Patent: Aug. 1, 2006

(54) APPARATUS FOR INCREASED EFFICIENCY IN CUTTING AND SEALING FILM EDGES

(75) Inventor: Brian R. Stork, Washington, MO (US)

(73) Assignee: Stork Fabricators, Inc., Washington, MO (US)

( * ) Notice: Subject to any disclaimer, the term of this patent is extended or adjusted under 35 U.S.C. 154(b) by 0 days.

(21) Appl. No.: 11/046,922

(22) Filed: Jan. 31, 2005

(65) Prior Publication Data

US 2005/0167056 A1    Aug. 4, 2005

Related U.S. Application Data

(60) Provisional application No. 60/540,372, filed on Jan. 30, 2004.

(51) Int. Cl.
*B30B 15/34* (2006.01)
(52) U.S. Cl. .................... 156/555; 156/582; 156/583.1
(58) Field of Classification Search ................ 156/515, 156/530, 555, 580, 582, 583.1; 493/189, 493/208
See application file for complete search history.

(56) References Cited

U.S. PATENT DOCUMENTS

| | | | |
|---|---|---|---|
| 5,956,931 A | 9/1999 | Stork | |
| 2002/0148569 A1* | 10/2002 | Stork | ......................... 156/555 |

* cited by examiner

*Primary Examiner*—James Sells
(74) *Attorney, Agent, or Firm*—Peter S Gilster; Greenfelder, Hemker & Gale, P.C.

(57) ABSTRACT

A heat sealing wheel assembly of a shrink wrap machine reduces thermoplastic film waste during the side cutting and sealing process. The relative diameters of the heat wheel and heating hub of the heat sealing wheel assembly are configured to create an annular region towards the outer circumference of the heat wheel. This creates a space to permit closer engagement of the gripping mechanism for grasping and guiding the edge of thermoplastic film next to the point of contact of the opposing heat wheel edges, and avoids the obstruction normally caused by the heating hub. The closer gripping engagement reduces the amount of film that must extend out from the point of sealing contact of the heat wheels, resulting in less waste during the side sealing process.

7 Claims, 10 Drawing Sheets

APPARATUS FOR INCREASED EFFICIENCY IN CUTTING AND SEALING FILM EDGES

CROSS-REFERENCE TO RELATED APPLICATION

This application claims priority from provisional patent application Ser. No. 60/540,372 filed Jan. 30, 2004, entitled APPARATUS FOR INCREASED EFFICIENCY IN CUTTING AND SEALING FILM EDGES.

BACKGROUND OF THE INVENTION

The invention relates to apparatuses for wrapping and sealing articles in a folded thermoplastic film. More specifically, the invention is directed to a mechanism for cutting and sealing the side edges of the plies of plastic enclosing the wrapped article.

There exist a wide variety of automated apparatuses, known as shrink-wrap machines, which provide a continuous supply of thermoplastic film for wrapping a series of articles fed through the machine. Machines of this type are well known in the art and are described generally in Stork U.S. Pat. No. 5,956,931. Typically, a shrink-wrap machine will include a conveyor system for transporting the objects to be packaged through the machine in serial fashion. Thermoplastic film is continuously dispensed from a supply roll disposed in close proximity to the conveyor belt. The film is usually dispensed as a single sheet, and the machine has mechanisms for folding the sheet to form two plies, placing the sheet onto the conveyor system, and depositing the article for packaging between the plies of the folded sheet. The conveyor system sends the film-draped articles on to further mechanisms in the machine where cutters and sealers cut and seal the plastic around the article, thereby enclosing it within the film to form the finished, packaged product. Typically, the cuts and seals are effected by subjecting the thermoplastic sheet to a heated knife bar or a heated sealing wheel. A knife bar is used to make transverse cuts, such as those for creating the end seals between individual packaged articles carried along the conveyor system. The shrink-wrap machine is usually automated through software programs that control the speed of the conveyor system, the timing of the stroke of the knife bar, and the height of the cutters, all of which function to control the dimension of the finished package.

The open side edges of the folded thermoplastic sheet are sealed together as the sheet is transported by the conveyor system. A heated sealing wheel is optimally used to make the side seal because it can effect a continuous seal and is not dependent upon the dimensions of the final sealed package. To ensure that the plastic sheet is driven through the sealing wheel at a constant uniform rate and that it is fed straightly and evenly, certain mechanisms such as rollers and grip chains are employed to grasp and urge the plastic sheet along. These mechanisms must be placed in close proximity to the heating wheel in order to be effective. However, the available space adjacent to the heating wheel is limited and these grabbing mechanisms are usually required to be substantially offset from the sealing point. Thus, in order for the plastic sheet to be engaged by these grabbing mechanisms, a substantial extra amount of the plastic sheet edge is required to be extended beyond the sealing edge of the heating wheel. This has always resulted in excess waste of thermoplastic material. It would be desirable to eliminate this waste of material, and provide a means for decreasing the amount of thermoplastic sheet edge material that must extend laterally beyond the heating wheel when effecting a side seal in the shrink-wrap process.

SUMMARY OF THE INVENTION

By means of the instant invention there is provided an improved shrink-wrap machine apparatus for reducing waste of thermoplastic sheet material during the sealing process. The invention provides for closer access of gripping mechanisms at the area of the heat seal wheel assembly that facilitate the conveyance of the thermoplastic sheet at a steady rate and in an even alignment as the sheet passes through the heat seal wheel assembly. The gripping mechanisms are vital to prevent misalignment or slippage of the sheet that can occur during the packaging and sealing operations carried out by the shrink wrap machine. Accordingly, it is necessary to grip the outer edge of the sheet on the outside of the heat seal wheel during the sealing process.

The heat seal wheel assembly comprises a pair of heat conducting discs whose peripheral edges oppose and meet each other in a common plane, forming a continual point of contact where the sealing of the side edges of the thermoplastic sheet occurs. The discs are driven by separate, outboard-facing axles. A heating element hub is disposed centrally on each of the discs and provide heat that is conducted radially to the peripheral edges of the discs. The heating element hubs necessarily have a certain thickness and their outer surfaces are offset from the outer edges of the discs. There is no available space in the shrink wrap machine for disposing the heating element hubs on the inboard side of the discs. The gripping mechanism, usually a dual, interlocking chain, grips the exposed edge of the thermoplastic sheet emanating from between the opposing peripheral edges of the discs. To minimize waste, it is essential that the gripping chains be positioned as close to the planar side of the discs as possible.

By means of the instant invention, a modified heat seal wheel assembly is provided which brings the gripping mechanism closer to the heating discs than has heretofore been capable.

DESCRIPTION OF THE INVENTION

Figure 1:
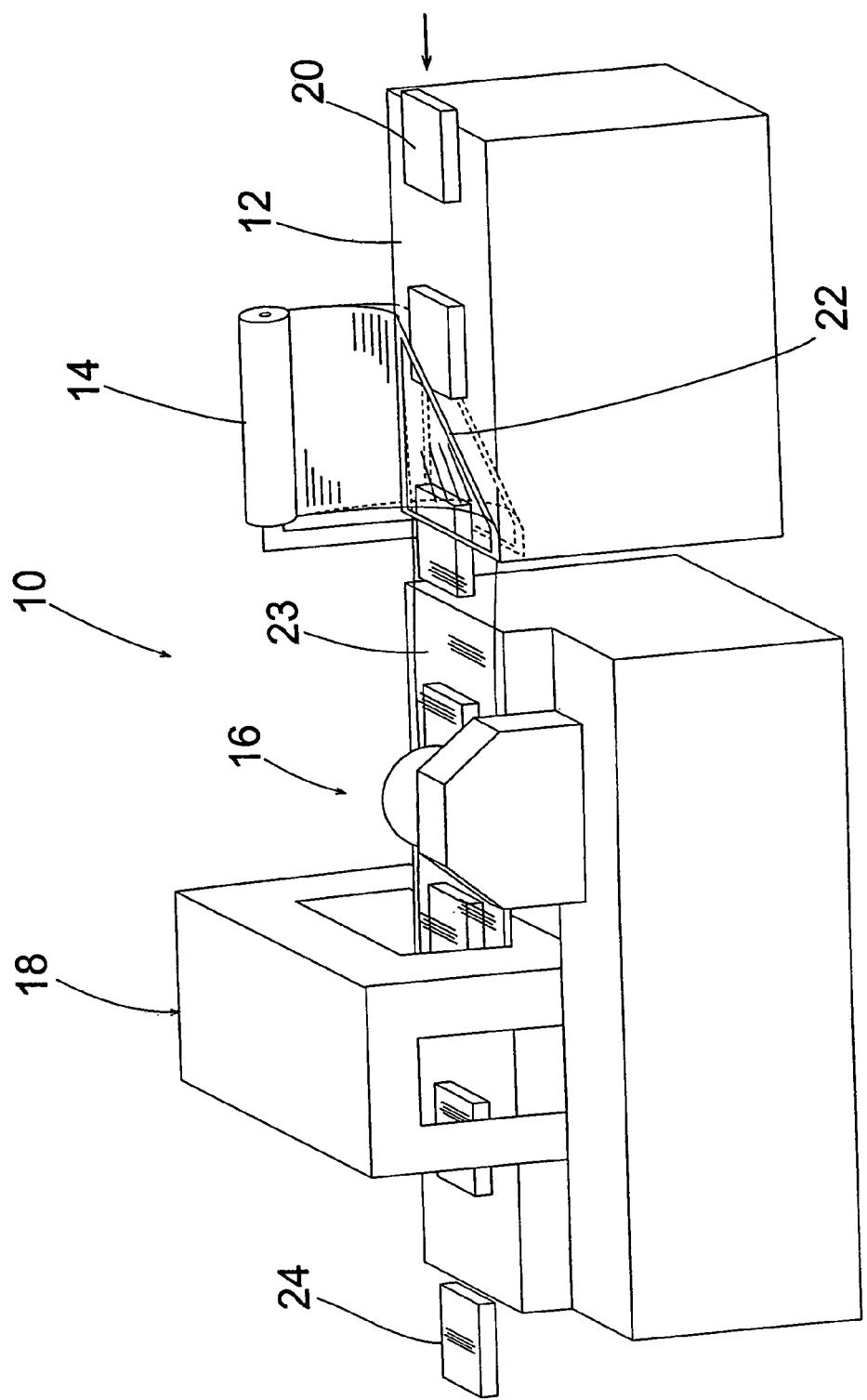
FIG. 1 is a perspective schematic view of a shrink wrap machine.

The invention comprises apparatus used in connection with a machine for wrapping and packaging articles in a thermoplastic film. The machine, commonly known as a shrink wrap machine, is shown in FIG. 1 and is generally indicated by the reference numeral 10. Its general structure and operation are well known to those having skill in the art, and therefore only structural and functional details relevant to the instant invention shall be discussed. In brief explanation, the shrink wrap machine 10 is generally comprised of a conveyor system 12, a supply 14 of thermoplastic film, a side sealing assembly 16, and a cross-cutting assembly 18. Articles 20 are fed through the shrink wrap machine on conveyor system 12, where they are first placed within a folded section of thermoplastic film 22. Mechanisms are provided for inverting an edge of the film 22 to create a two-ply layer of film between which the article 20 is placed. A continuous sheet 23 of folded-over, two-ply film, with articles 20 placed between, is conveyed through shrink wrap machine 10 where it is subjected to sealing and cutting for creating individually wrapped articles 24.

Figure 2:
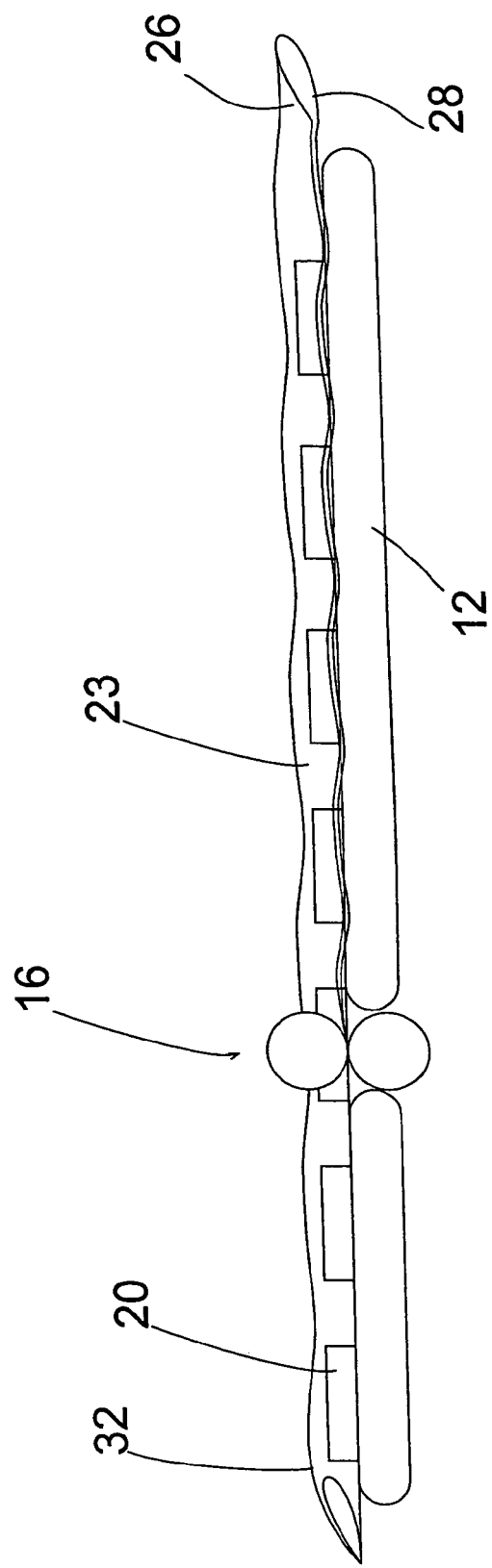
FIG. 2 is a schematic side-elevation view of a conveyor system and film side-sealing apparatus of a shrink wrap machine, with other components of the shrink wrap machine removed for clarity.

The folded thermoplastic film 23 is first sealed along its side edges 26 and 28 by side sealing assembly 16 to create a continuous sleeve 32 around the articles 20 as shown in FIG. 2. Transverse cuts and seals are subsequently made along sleeve 32 within the shrink wrap machine to enclose articles 20 within their own discrete packages 24. This further processing is beyond the scope of this invention and need not be discussed in any further detail.

Figure 3:
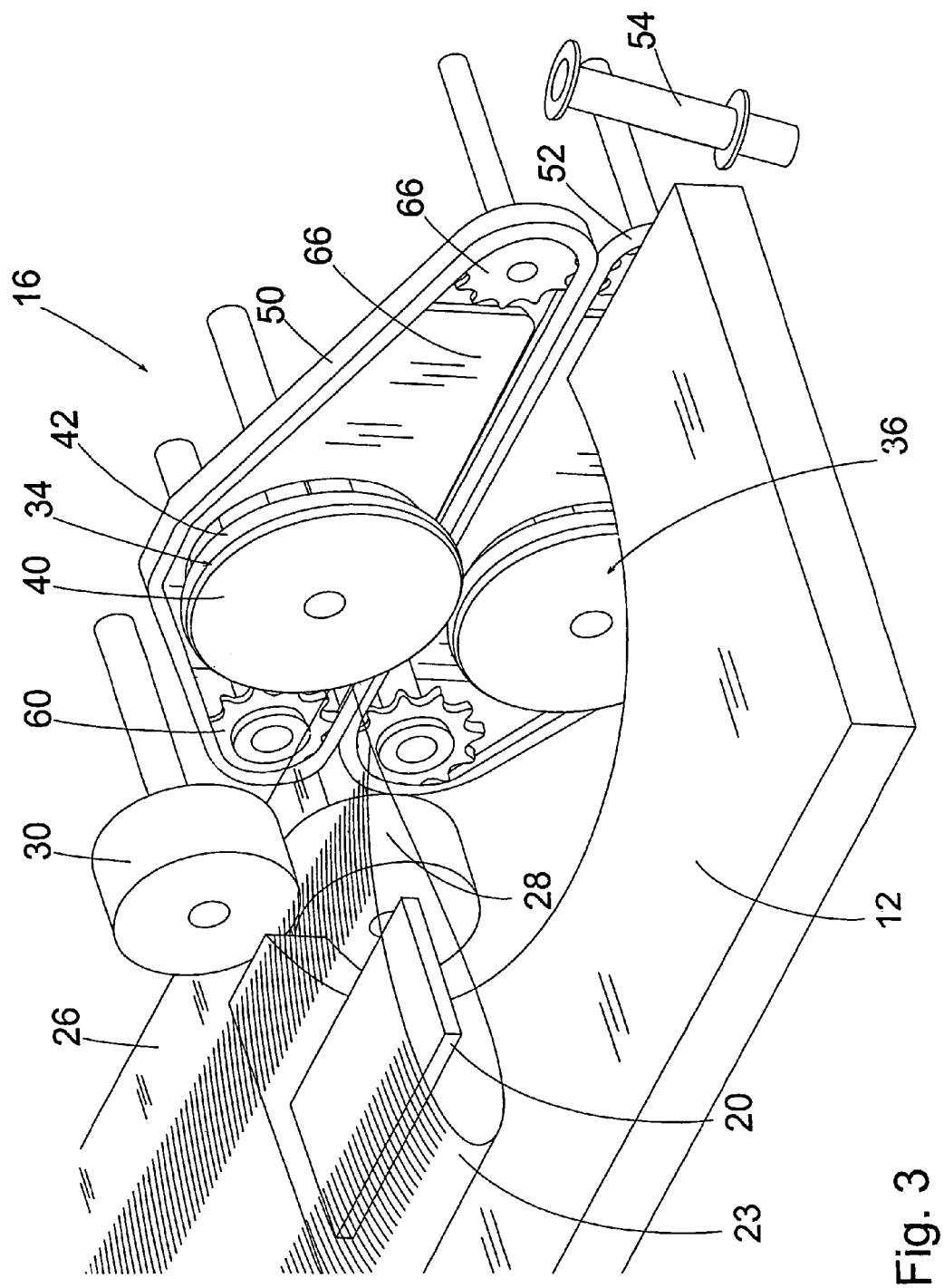
FIG. 3 is a perspective view focusing on the interior aspect of the side-sealing apparatus of the shrink wrap machine, with the thermoplastic film sleeve approaching the side sealing apparatus, with a portion of the conveyor bed cut away to show the lower portion of the side sealing apparatus.
Figure 3A:
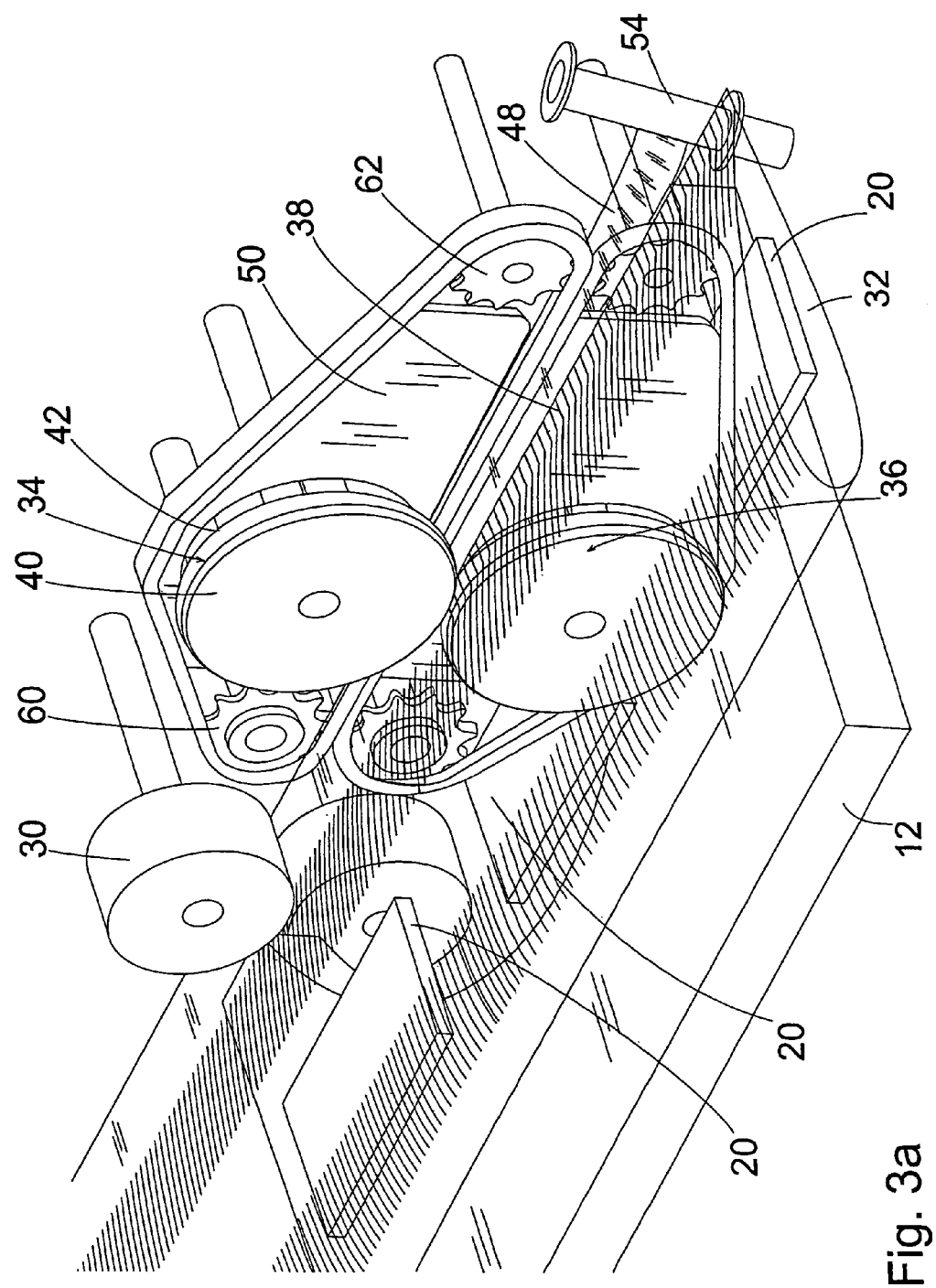
FIG. 3a is another perspective view focusing on the interior aspect of the side-sealing apparatus of the shrink wrap machine, with an end of the side sealed thermoplastic film sleeve exiting the side sealing apparatus.

The instant invention focuses on the side sealing assembly 16 for creating the continuous seal along edges 26 and 28 of thermoplastic film 23. As can be seen in FIGS. 3 and 3a, the side sealing assembly 16 comprises a pair of wheel assemblies 34 and 36 having circumferential opposing edges aligned in a common vertical plane. The edges 26 and 28 of thermoplastic film 23 are advanced along the conveyor system by rollers 30 and fed between the wheel assemblies 34 and 36 where a seal 38 is effected, thereby creating continuous thermoplastic film sleeve 32. Each wheel assembly is comprised of a nip roller 40, heat wheel 42 and heating hub 44. A gripping mechanism 46, such as interlocking chains, is also disposed adjacent to the exterior aspect of the wheel assembly, which is outboard with respect to the conveyor system 12. Nip rollers 40 serve to draw the side edges 26 and 28 of film 23 evenly together and perpendicular to the plane of the wheel assemblies to promote an even seal. This is necessary when accommodating various sizes of packaged articles. As the dimension of the article to be packaged increases, upper film edge 26 will fall out of perpendicular alignment to the plane of the wheel assemblies and must be brought back into even registry thereto by nip roller 40 to prevent uneven sealing. The opposing heat wheels 42 engage the film edges tightly together for effecting the side seal. Heat wheel 42 is heated by heating hub 44, and the heat acts to melt and seal the film edges 26 and 28 together and also to trim off the excess film edge 48. In a preferred embodiment, gripping mechanism 46 is comprised of interlocking chains 50 and 52 which grip film edge 48 therebetween. Upper chain 50 runs a continuous loop around wheel assembly 34 and is driven by a pair of sprockets 60 and 62, and is maintained in its circuitous path by guide plates 64 and 66 positioned adjacently to heating hub 44 of the wheel assembly. Lower chain 52 is symmetrically opposite to upper chain 50 and is similarly positioned with respect to the lower wheel assembly, except that it is positioned slightly offset from upper chain 50. The offsetting of the chains permit the individual links of the opposing chains to interlock, effectively gripping the edge of the thermoplastic film therebetween. #35 chain is commonly used for this purpose. Gripping mechanism 46, however, is not limited to interlocking chains, and other mechanisms known to those skilled in the art may be used. The excess film 48 that results from the sealing and trimming is thus carried off to a take-up spool 54. Gripping mechanism 46 is also necessary for assisting in drawing thermoplastic film 23 through the side sealing assembly evenly and at a steady rate.

Figure 4:
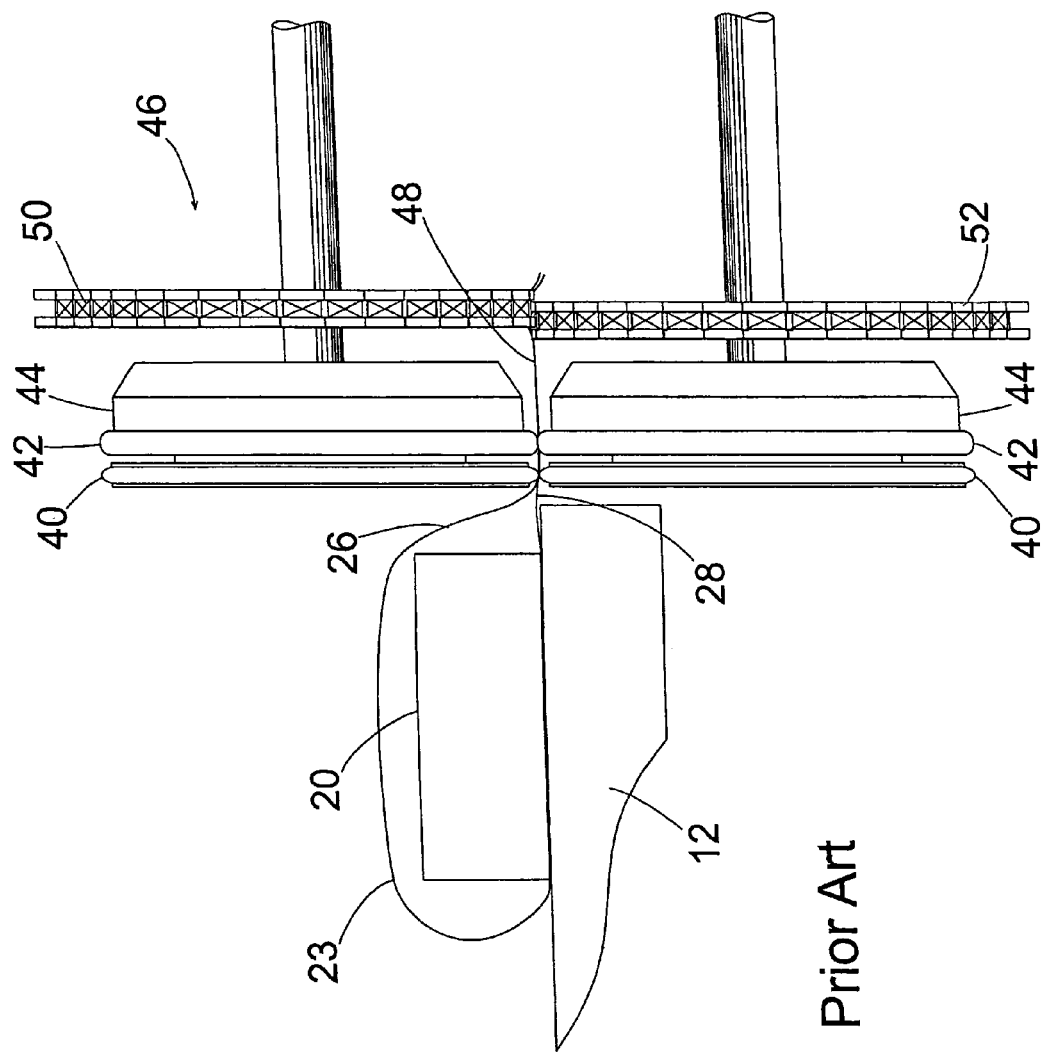
FIG. 4 depicts a prior art side-sealing apparatus for a shrink wrap machine, and is a view in side elevation thereof taken from an end view of the shrink wrap machine as products would exit the apparatus.
Figure 8:
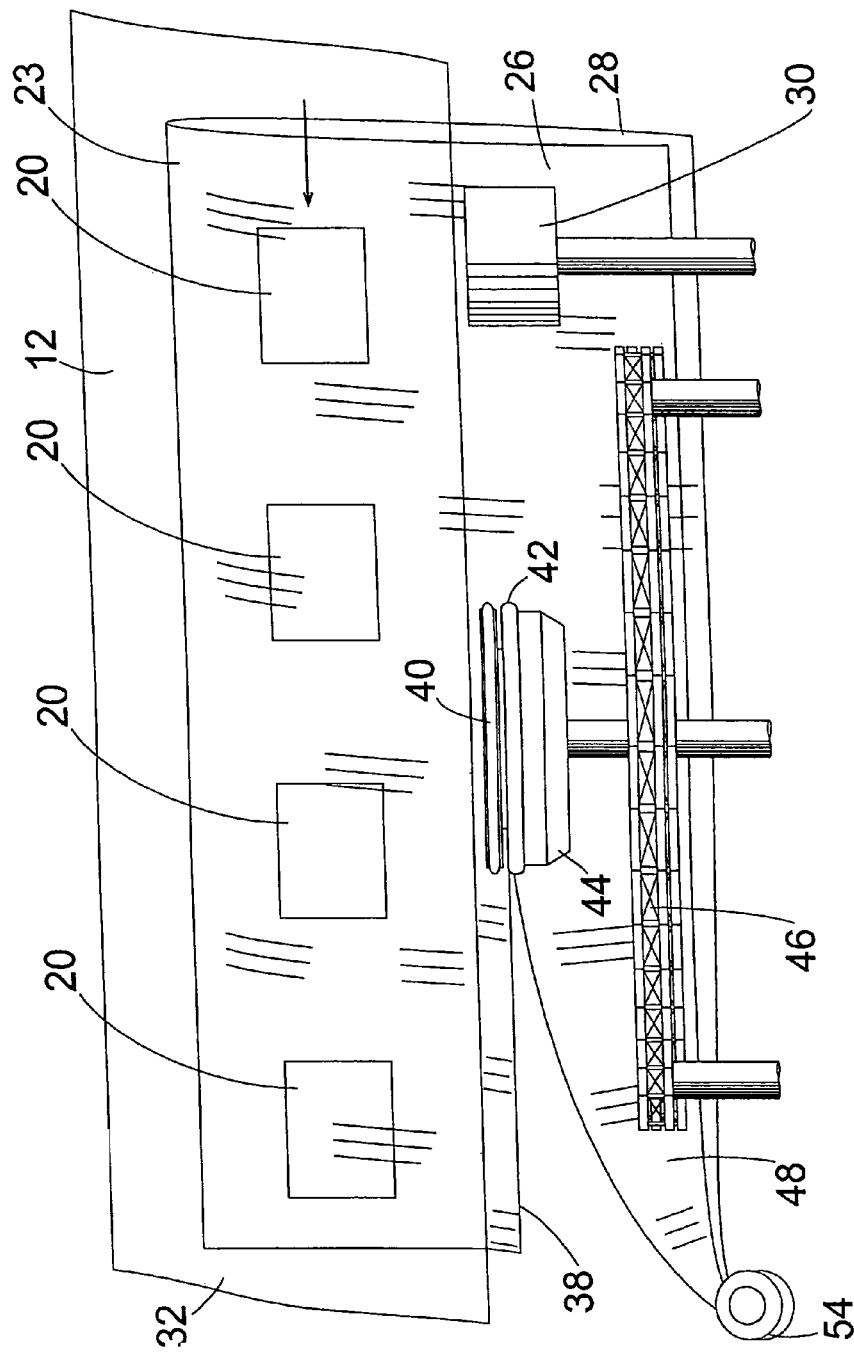
FIG. 8 is a top plan view of a prior art side sealing apparatus of a shrink wrap machine.

A limitation in prior art side sealing assemblies is the excess waste 48 of thermoplastic film generated as a consequence of the use of the gripping mechanism. While it is necessary to place the gripping mechanism as close to the heat wheel 42 as possible, heating hub 44 has always presented a spatial obstacle as can be seen in heating wheel assemblies of the prior art shown in FIGS. 4 and 8. The gripping mechanism is prevented from getting any closer to the heat wheel 42 than permitted by the outer side of the heating hub 44. Accordingly, the amount of film waste 48 generated during the side sealing process has heretofore never been decreased less than the width represented by the thickness of the heating hub itself. When factoring in the width of the heating hub, and the width of the gripping mechanism, the excess trim 48 of thermoplastic film generated by prior art side sealing mechanisms can exceed 1.60 inches. This equates, over time, to a substantial amount of film.

PREFERRED EMBODIMENT

Figure 5:
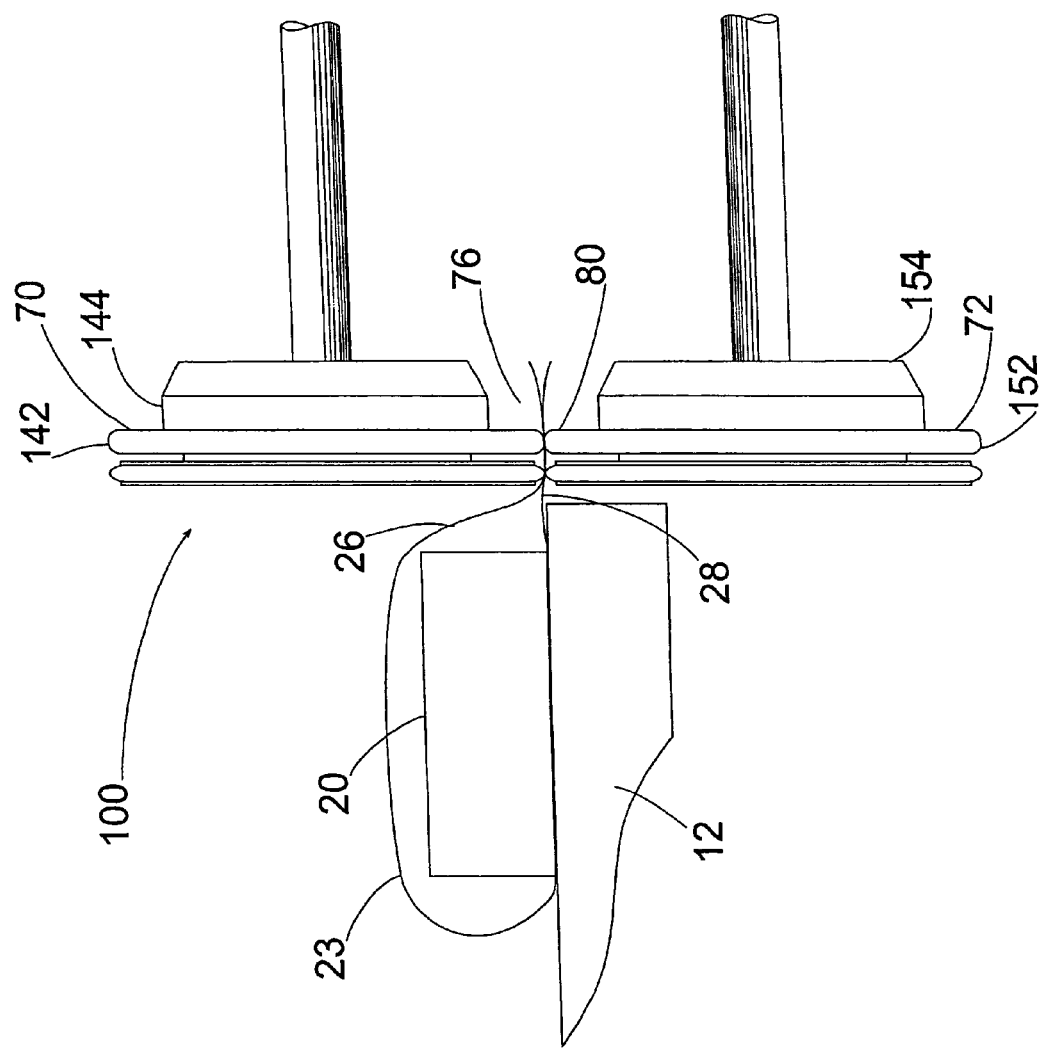
FIG. 5 is a view in side elevation of the inventive side-sealing apparatus of the shrink wrap machine as products exit the apparatus, with the gripping mechanism removed to permit better viewing.

The heating wheel assembly 100 of the instant invention, shown in FIG. 5, has a modified structure which permits the gripping mechanism to grab the thermoplastic film edge in close proximity to the heat wheel, unimpeded by the heating hub. Specifically, the relative diameter of the heat wheel 142 is increased with respect to the diameter of heating hub 144. This effectively provides an annular region 70 on the outer region of heat wheel 142 that extends beyond the outer circumferential edge of the heating hub 144. Heat wheel 152 of the opposing heating wheel assembly also has its relative diameter increased with respect to the diameter of heating hub 154, effectively providing an annular region 72 on the outer region of heat wheel 152 that extends beyond the outer circumferential edge of the heating hub 154. In the opposing positions of the heat wheel assemblies, annular regions 70 and 72 combine to create gap 76. In creating the annular regions 70 and 72, either the diameter of the heat wheel may be increased or the diameter of the heating hub may be decreased (or both conditions may occur), so long as the relative diameter of the heat wheel is increased with respect to the heating hub. The heat wheels should have sufficient heat conducting qualities for conducting the heat from the heating hubs over the annular distances 70 and 72 to their circumferential edges to generate sufficient heat for effecting the heat sealing of the film edges.

Figure 6:
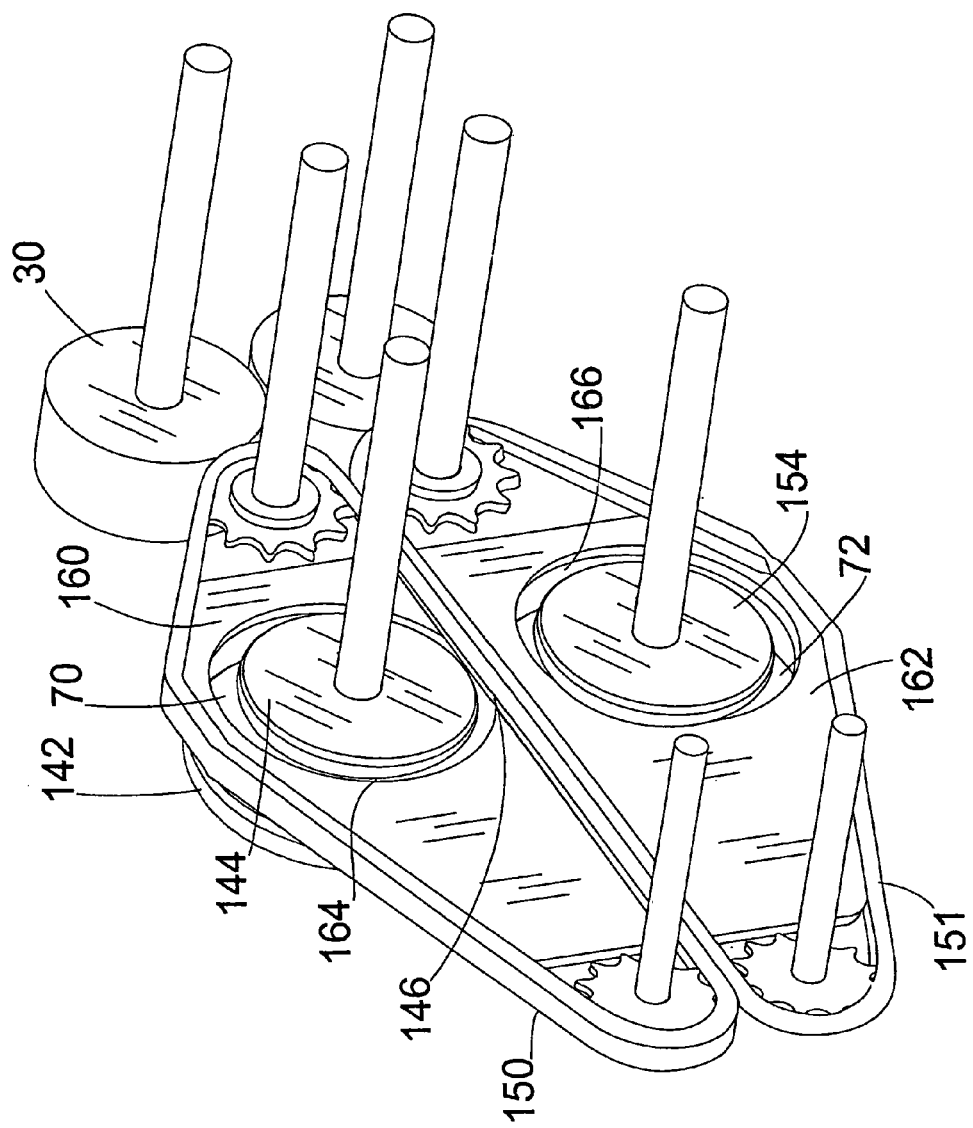
FIG. 6 is a perspective view of the exterior aspect of the side-sealing apparatus of the shrink wrap machine.
Figure 7:
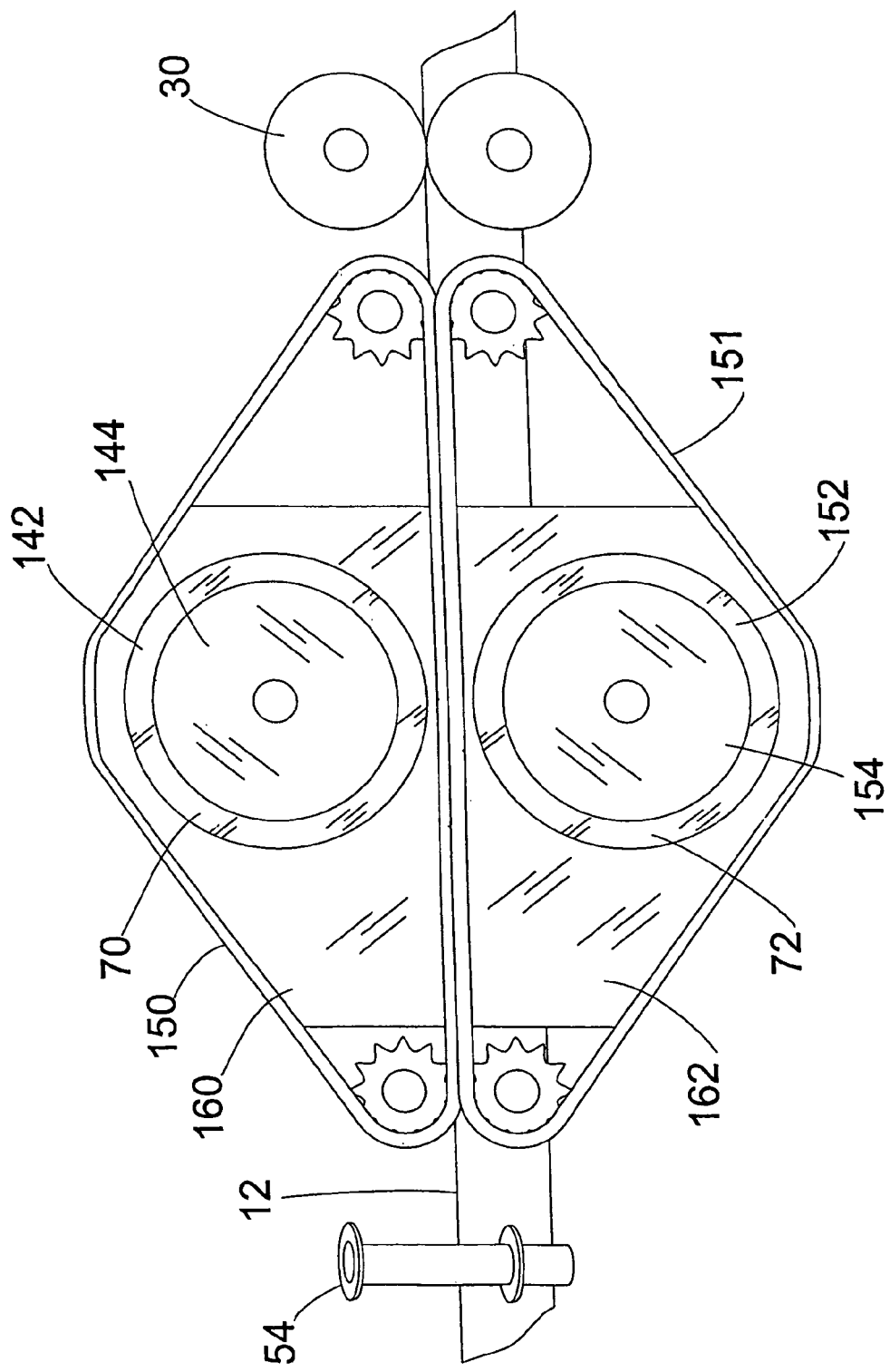
FIG. 7 is a view in side elevation of the exterior aspect of the side-sealing apparatus of the shrink wrap machine.
Figure 9:
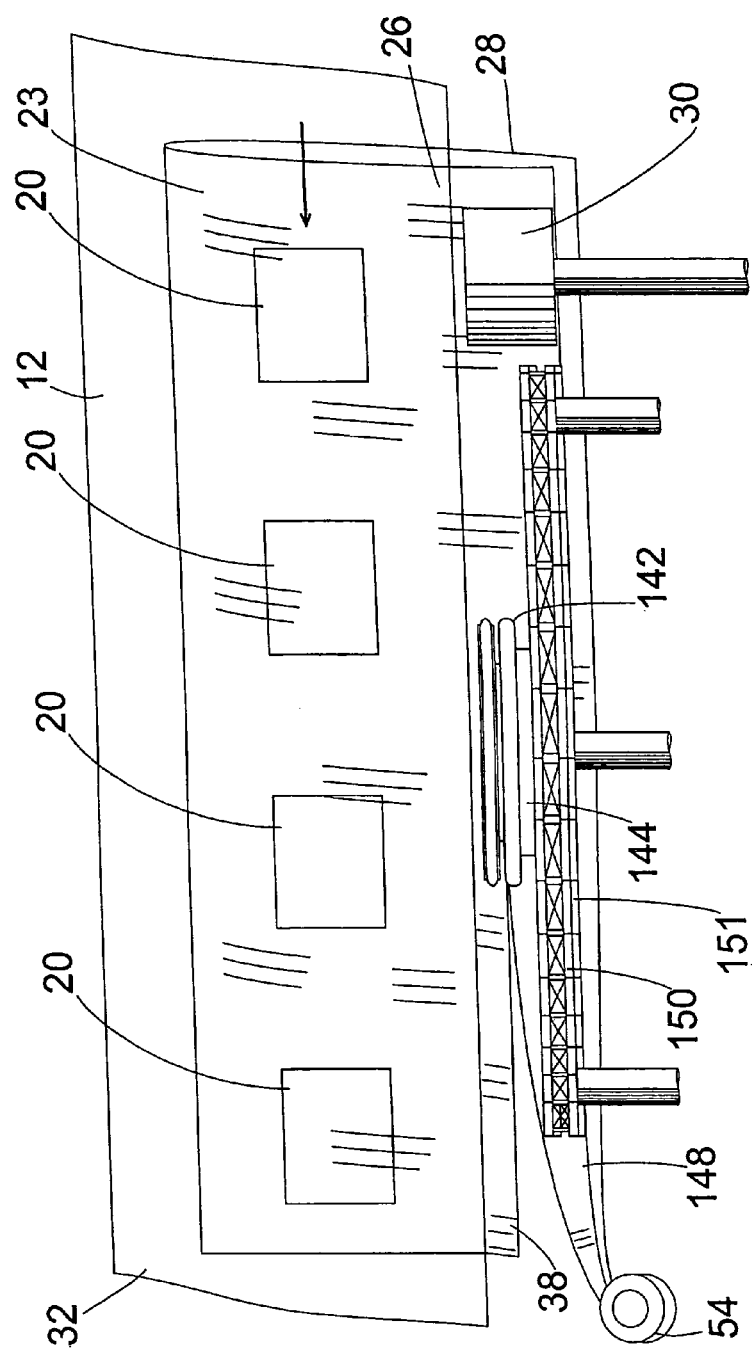
FIG. 9 is a top plan view of the inventive side sealing apparatus for a shrink wrap machine.

Gap 76 provides clearance for gripping mechanism 146 to more nearly approach the point of contact 80 between heat wheels 142 and 152 and avoid heating hubs 144 and 154, as can be clearly seen in FIG. 5. Interlocking chains 150 and 151 meet in gap 76, as seen in FIGS. 6 and 9, where they grip the trimmed excess film 148. Similarly, annular regions 70 and 72 provide clearance for guide plates 160 and 162, respectively, for chains 150 and 151 to have an unimpeded, circuitous path through gap 76 and around the heating hubs 144 and 154. Guide plates 160 and 162 are provided with cut-out regions 164 and 166, respectively, to permit their placement over and around heating hubs 144 and 154. This enables the guide plates, and therefore, the gripping mechanism chains to gain closer access to heat wheels 142 and 152. Each annular region should have a radius dimension sufficient to accommodate the combined width of the chain and portion of the guide plate at the Twelve O'clock position of heat wheel 142, and the Six O'clock position of heat wheel 152. This will then also permit sufficient clearance at the area of interlocking engagement of the chains at the Six O'clock position of heat wheel 142 and the Twelve O'clock position of heat wheel 152. The annular region of the outer heat wheel may be manufactured to have a dimension of any particular size, but in any event, must be sufficient to accommodate the combined width of the interlocking chain and the portion of the guide plate carrying the chain. As an example, heat wheel 142 may have a diameter of 4.50 inches. If the interlocking chain 150 of gripping mechanism 146 has a width (top to bottom dimension of each link) of 0.5 inches, and the portion of guide plate 160 at the Twelve O'clock position has a width (top to bottom) of 0.2 inches, it would be desirable to create an annular region of 0.8 inches to permit sufficient clearance of the chain and guide plate at the Twelve O'clock position. To create the annular region of 0.8 inches, heating hub 144 should have a diameter of 3.70 inches or less. The combined annular regions of heat wheels 142 and 152 would then create a gap 76 of 1.60 inches at the Six O'clock position of heat wheel 142. It should be understood that the respective dimensions of the heat wheel, heat hub, and gripping mechanism guide plate are variables, any of which can be varied with respect to the other to create an appropriate sized annular region. Furthermore, the configuration of the gripping mechanism may also influence the desired dimension of the annular region.

Through this closer placement to the heat wheels, the gripping mechanism may engage the excess film edge along points closer to the heat wheels, preferably less than 1.50 inches from the contact point 80 between the wheels. Accordingly, the placement of the thermoplastic film on the conveyor system may be adjusted so that less of the film edge protrudes from the exterior aspect of the heating wheel assembly as film sleeve 32 is conveyed and processed through the shrink wrap machine.

Accordingly, the amount of thermoplastic film required to be extended from the heat wheels for engagement with the gripping mechanism can be significantly decreased, resulting in less waste during the side sealing process. Even one-half an inch less film wasted translates into a substantial cost saving in film used over time. The following example highlights this point. Assuming that for a 20-inch roll of thermoplastic film costing $200, the proportionate cost per width inch is $10. If one-half of an inch less is wasted during the edge sealing process, $5 per roll is saved. Typically, four rolls of thermoplastic film may be used during an operational shift of the shrink-wrap machine, and two shifts are run per day. Accordingly, each day $40 of film waste is avoided. If this use trend is extended over an entire year of two shift-days, and 52 five-day weeks, a savings of $10,400 per year may be realized. Over the life of the shrink wrap machine, which can be ten years, a savings of over $100,000 may be made possible.

Various changes and modifications may be made within this invention as will be apparent to those skilled in the art. Such changes and modifications are within the scope and teaching of this invention.

What is claimed is:

1. A heat sealing wheel assembly for a shrink wrap machine, the assembly providing side cutting and heat sealing of thermoplastic film, and wherein waste film is produced during the side cutting and sealing, the assembly comprising:

a gripping mechanism for gripping side edge portions of overlapped plies of thermoplastic film and for feeding the overlapped plies in a direction for heat sealing by at least one heat sealing wheel, at least one such heat sealing wheel;

a gripping mechanism for gripping side edge portions of overlapped plies of the thermoplastic film and for guiding and feeding the overlapped plies in a direction for heat sealing and cutting by the heat sealing wheel;

a heating hub of the heat sealing wheel for heating the heat sealing wheel sufficiently to effect a continuous side seal of overlapping plies of the thermoplastic film and to cut off a waste portion of the plies, the heating hub having an outer circumferential edge;

relative diameters of the heat sealing wheel and heating hub of the heat sealing wheel assembly being configured such that the heating hub has a diameter relatively less than a diameter of the heat sealing wheel so as to create an annular region near an outer circumference of the heat sealing wheel, and such that said annular region defines a free space extending beyond the outer circumferential edge of the heating hub and constituting an access gap for access by said gripping mechanism to an exposed edge of the side edge portions of overlapped plies of the thermoplastic film to permit close engagement of the gripping mechanism for grasping and guiding the side edge portions of thermoplastic film next to a point of contact of the heat sealing wheel with the plies of film;

the annular region avoiding obstruction by the heating hub as overlapped plies of thermoplastic film are guided and fed by the gripping mechanism for heat sealing and cutting by the heat sealing wheel such that close gripping engagement of the plies is provided by the gripping mechanism to reduce an amount of waste film that must extend out from a point of sealing contact with the heat sealing wheel.

2. A heat sealing wheel assembly as set forth in claim 1 wherein the gripping elements are formed by a dual, interlocking chain.

3. A heat sealing wheel assembly according to claim 2 wherein portions of the interlocking chain are located for grasping and guiding the side edge portions of thermoplastic film next to a point of contact of the heat sealing wheel within said free space.

4. Shrink-wrap machine apparatus for reducing waste of thermoplastic sheet material during a heat sealing process for a side sealing, the apparatus including a heat seal wheel assembly which comprises:

a pair of heat conducting discs serving as heat seal wheels;

the discs having peripheral edges that oppose and meet each other in a common plane to forming a continual point of contact at which sealing of the side edges of overlapped plies of the thermoplastic sheet occurs;

the discs being driven by separate, outboard-facing axles;

a heating element hub disposed centrally on each of the discs to provide heat conducted radially to the peripheral edges of the discs;

the heating element hubs necessarily have a certain thickness and having outer surfaces offset from the outer edges of the discs so as to provide an access gap for access to an exposed edge of the thermoplastic sheet;

a gripping mechanism adapted to grip within said gap an exposed edge of the thermoplastic sheet emanating from between the opposing peripheral edges of the discs;

the gripping mechanism containing gripping elements positioned within said access gap as close to the planar side of the discs as possible to permit close engagement of the gripping mechanism for grasping and guiding the side edge portions of thermoplastic film next to a point of contact of the heat sealing wheel with the plies of thermoplastic film the annular region;

said access gap avoiding obstruction by the heating hub as overlapped plies of thermoplastic film are guided and fed by the gripping mechanism for heat sealing and cutting by the heat sealing wheel;

whereby the heat seal wheel assembly brings the gripping mechanism close to the heating discs within the access gap to result in minimal side waste that must extend cut from a point of sealing contact with the heat sealing wheel during the heat sealing process.

5. Shrink-wrap machine apparatus as set forth in claim 4 wherein the gripping mechanism comprises interlocking gripping chains on opposite faces of the side edges of the overlapped plies, and said chains meet in opposing relationship within said access gap.

6. Shrink-wrap machine apparatus as set forth in claim 5 wherein each of the gripping chains runs as a respective continuous driven loop relative to the wheel assembly elements and is maintained in its circuitous path by guide plates positioned adjacently to a respective heating hub, and wherein the chains are symmetrically opposite, but with one chain positioned slightly laterally offset from the other chain in a region contacting the overlapped plies, such offsetting of the chains permits individual links of the opposing chains to interlock, effectively gripping the side edges of the thermoplastic film therebetween.

7. Shrink-wrap machine apparatus as set forth in claim 4 wherein the heating element hubs extend in mutual alignment laterally outwardly from the respective discs in the direction toward the side edges of the thermoplastic film so as to provide an access sector vertically disposed between each heating element hub and a respective surface adjacent the side edges of the thermoplastic film such that the respective surface is disposed for gripping engagement by the gripping elements, the access sector providing thereby said access gap.

* * * * *